Sept. 19, 1961     C. O. SCHMIDT     3,000,645
EXTRA PASSENGER ATTACHMENTS FOR INFANTS' VEHICLES AND THE LIKE
Filed Aug. 23, 1957     2 Sheets-Sheet 1

INVENTOR,
Carl O. Schmidt,
J. Stuart Freeman,
Attorney.

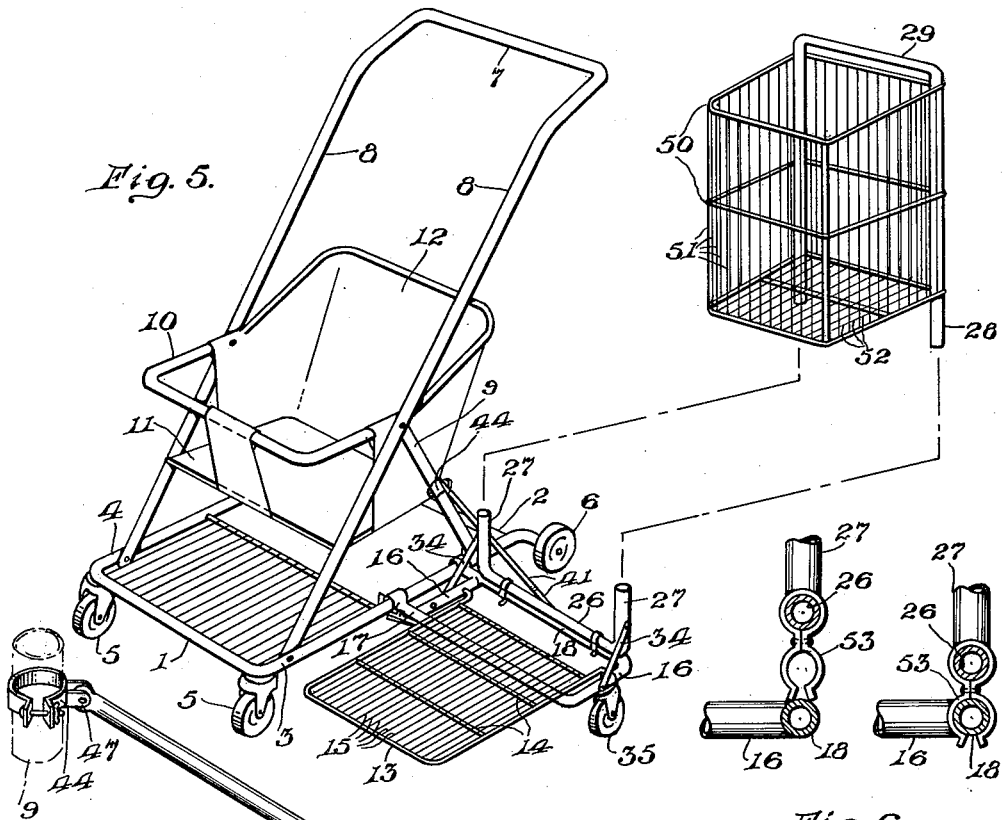
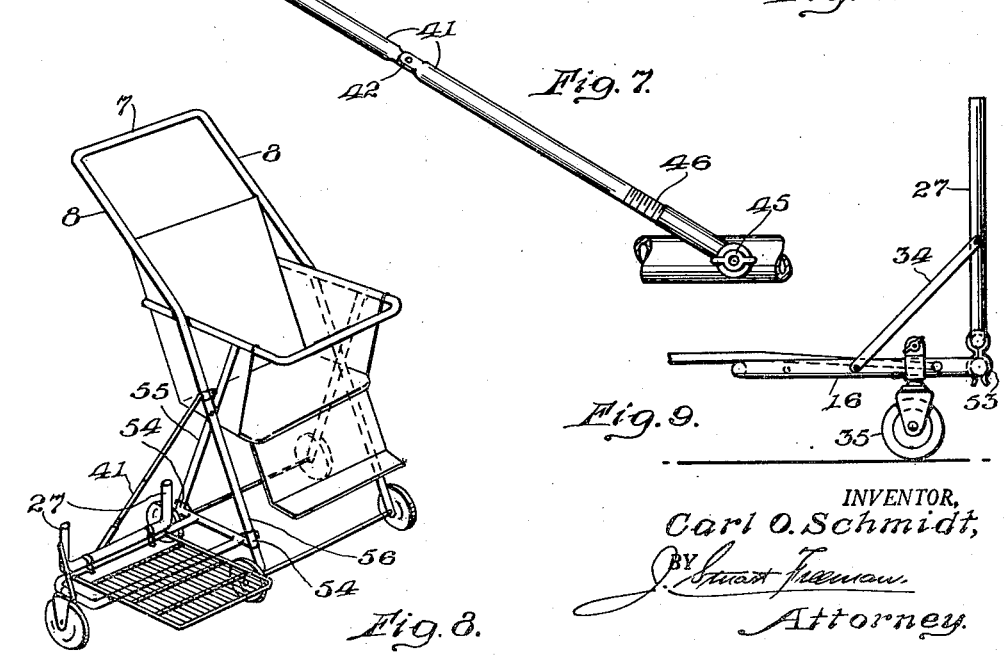

United States Patent Office 3,000,645
Patented Sept. 19, 1961

3,000,645
EXTRA PASSENGER ATTACHMENTS FOR
INFANTS' VEHICLES AND THE LIKE
Carl O. Schmidt, 4116 Old York Road, Philadelphia, Pa.
Filed Aug. 23, 1957, Ser. No. 679,855
3 Claims. (Cl. 280—39)

The object of the invention is to provide improvements in vehicles particularly designed for carrying and transporting young children, and has for its special object to provide for the simultaneous transportation of a very young infant in a baby carriage, stroller, or equivalent device, and at the same time provide for carrying a somewhat older child in a second device, that can be detachably secured to such baby carriage, as long as it may be desirable to keep the second child close by the parent, nurse, or other person, and which second device thereafter can be readily detached from the baby carriage and stored until it is again necessary to use it.

A further object, therefore, is to provide the combination of any well known form of baby carriage with a readily attachable and detachable auxiliary vehicle, which preferably is supported at its outer free edge portion by a single wheel, and otherwise essentially comprises a platform capable of satisfactorily supporting one or more children other than the occupant of the baby carriage, and upon which may be readily mounted a preferably detachable seat, while about the periphery of said platform may extend an upwardly directed flange having the dual purpose of both stiffening said platform, and at the same time providing a shallow but effective means for preventing the accidental slipping of a child or other object laterally therefrom.

Throughout the following description and the appended claims, it is to be understood that the generic term baby carriage is intended to include within its scope, pushcarts, perambulators, pushmobiles, and the like, as well as the ordinary baby carriage as such. Similary, instead of the auxiliary sidecar or secondary vehicle being used solely as a movable support for young children, it may as well be employed to transport a satchel, suitcase, boxes, bundles, or other objects, that the operator of the carriage may wish to transport between two or more points, in order to save the extra cost of taxi fares, express charges, double and even triple trips, etc. It is to be further understood that, instead of a sheet metal base or floor for said device, a criss-cross wire mesh may be used, or, if preferred, a simple arrangement of parallel wires forming a grill.

Figure 1:
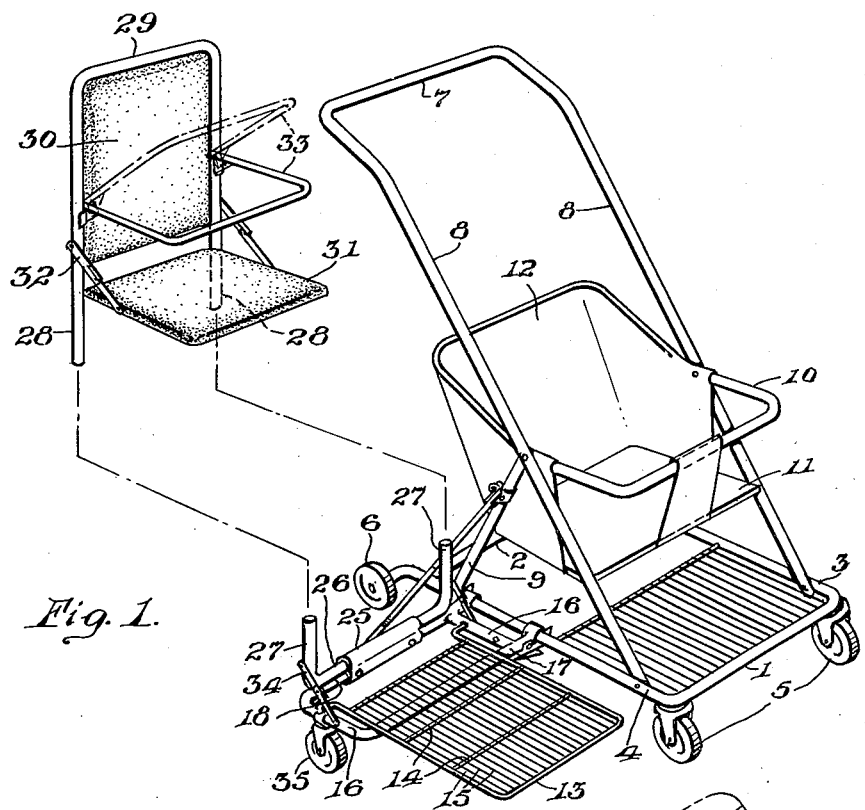
Figure 2:
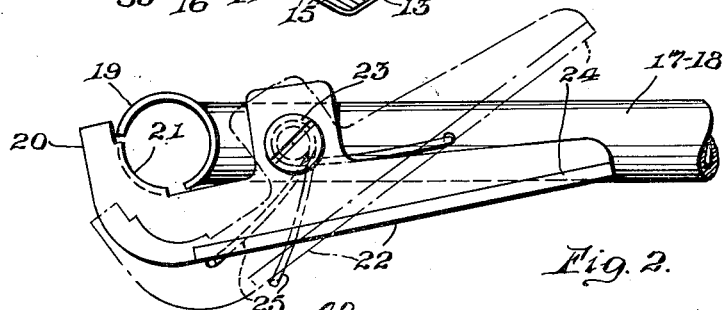
Figure 3:
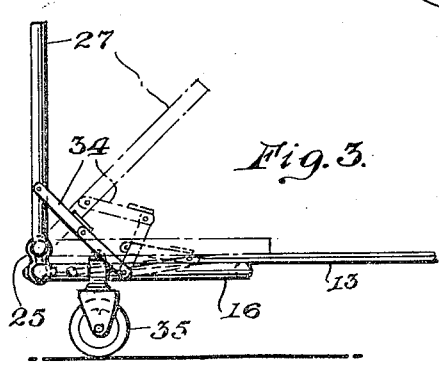
Figure 4:
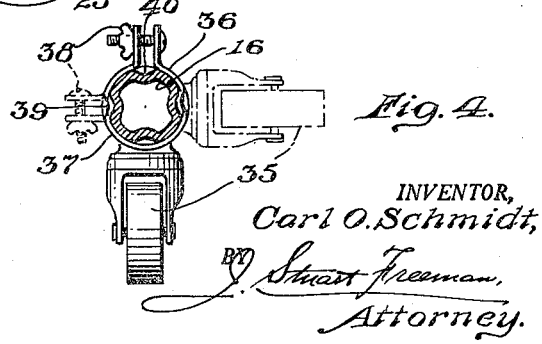

With the objects thus briefly and broadly set forth, the invention comprises further details of construction, function and operation, when read in conjunction with the accompanying drawings, in which FIG. 1 is a perspective view showing a representative type of pushcart to which one embodiment of the invention is operatively attached upon the right side of the operator, and with a detachable collapsable seat indicated by dot-and-dash lines as being attachable to said pushcart, but removed therefrom in order to prevent confusion that might result from them overlapping; FIG. 2 is an enlarged fragmentary view showing a highly efficient clamping device for operatively securing said attachment to the pushcart of FIG. 1, or to another vehicle of this broad class; FIG. 3 is a fragmentary side elevation showing the construction by which the seat-supporting elements of said attachment may be angularly dropped at will into operative parallelism with respect to the base or flooring of said attachment; FIG. 4 is an enlarged fragmentary detail showing the mounting by which the single supporting wheel of said attachment may be oscillated angularly into inoperative position with respect to said base or flooring; FIG. 5 is a perspective view similar to that of FIG. 1, but showing such an improved attachment operatively secured to the left side of the pushcart or the like, and with a mesh container indicated as being detachably attachable to the normally upright tubular posts of said auxiliary device; FIG. 6 comprises two fragmentary detail views showing in the first instance the seat or basket supporting element as being separated slightly from the supporting platform, while showing in the second instance the manner in which these parts or members are normally operatively secured together; FIG. 7 is a side elevation of the diagonal brace member by which the attachments are maintained at a predetermined angular relation with respect to the frame of the vehicle to which said auxiliary device may be attached; FIG. 8 is a perspective view showing a somewhat more simple type of pushcart to which a simple form of said attachment is operatively secured; and FIG. 9 is a fragmentary side elevation showing the connection between the frame of said improved attachment and the normally upright tubular supports for either a seat, a marketing basket, or in fact any other desired object of this general nature.

Referring to FIGS. 1 to 4 in particular, the representative form or type of pushcart here shown comprises a substantially rectangular lower horizontal frame composed of a front tube 1, a rear tube 2, left tube 3 and right tube 4, which, however, are here illustrated as comprising integral portions of a single bent tube, and the surrounded space being spanned by a wire mesh or other form of footrest. Secured to and depending from this base frame are a pair of front wheels 5 and a pair of rear wheels 6. A handle and direction controlling element is shown as comprising a manually engageable central, upwardly and rearwardly extending portion 7, from the laterally opposite ends of which extend a pair of laterally positioned, and diagonally forwardly and downwardly extending shafts 8, the free ends of which are firmly secured to the forward portions of the respective lateral tubular base frame sections 3 and 4, and made rigid against angular oscillation by means of diagonal brace pieces 9. Secured to and between the handle shafts 8 in any suitable manner is a seat unit, that comprises a generally rectangular frame 10, from which depends a seatboard 11 by means of intervening supporting webbing 12 of any desired shape, material and arrangement.

The improved auxiliary attachment in this case comprises a generally U-shaped horizontal frame 13, the opposite side elements of which are connected by means of preferably welded ribs 14, that are spanned by a series of parallel wires 15, though it is to be understood that in lieu of this wire type of grid other suitable forms of supporting elements may be used, such for example as a perforate or even an imperforate plate (not shown specifically), that may be made rigid in any well known manner as for example by means of a peripheral flange and diagonally extending embossed ridges and grooves, or otherwise in any well known manner, as may be desired. In this case the rearmost end portions of the frame 13 are directed laterally outwardly in opposite directions, and terminate in rigid association with laterally spaced abbreviated tubular members 16, that are connected together forwardly by a transverse section 17 and rearwardly by a second transverse section 18. Preferably in general alignment with said front and rear sections said frame is provided with freely projecting clamping means, that is shown in detail in FIG. 2.

Here it is shown that the free end portion of each of said transverse sections terminates in a transversely open cylindrical head 19, that normally encircles about one-half of the cylindrical extent of the right hand base frame section 4, or by reversing the several parts may similarly encircle the left hand base frame section 3, when in the form shown in FIG. 5. In order to prevent the escape of such frame section from within said clamping cylinder, a special form of latch is shown as comprising a clamping head 20 having a radial extension 21, that normally enters the open side of said head and bears directly against and secures within said head a portion of the base frame element 4. Said clamping head comprises one end portion of a latch element 22, that is pivotally secured to its supporting tubular element 17—18 by a suitable pin 23, and extends in an opposite direction beyond said pin to form an operating lever or handle 24, while a suitable spring 25 functions to maintain said latch yieldably in closed or clamping position. Of these clamps there are preferably two, as more than the number are not required, and if but a single clamp were used, a rigid attachment could not be expected to inure against angular oscillation.

To the central rear portion of the rearmost attachment frame piece 18 is rigidly secured a clamp 25, that also slidably encircles a parallel, horizontally extending, central base portion 26 of a U-shaped element, whose opposite end portions 27 normally extend upwardly in parallelism, and are operative to slidably receive the lower portions of a pair of tubular members 28 of an inverted U-shaped seat frame 29, between the upper portions of which is positioned the back cushion 30. Pivotally secured between said tubular back members is the rearmost portion of a seat element 31, that is normally maintained in operative horizontal position by means of angularly retractable braces 32, that also connect the sides of said seat element to said frame members. A generally horizontally positioned U-shaped restraining member 33 is pivotally secured at its opposite ends to said tubular members, and may be raised and lowered as indicated in FIG. 1. Normally such seat unit is supported by and between the end portions 27 of the supporting element 26, but when removed therefrom said element may be retracted into lowered position (FIG. 3) by means of the link braces 34.

When so lowered by means of said braces, the seat-supporting portions 27 of the element 26 may be lowered into close parallelism with the base frame 13—15, and at the same time the single supporting wheel 35 may be oscillated into a retracted horizontal position, by means of its supporting collar 36 being made to swing around the supporting tubular member 16, when its collar clamp 37 is loosened by the bolt 38, and the radially inwardly projecting lug 39 of said collar moves from one indentation 40 to another in the outer surface of said supporting tube. Finally, as to the form of the device thus initially described, the maximum outwardly extending horizontal position of said auxiliary platform and of the said attachment in general is maintained in predetermined fixed position and relationship by means of a sectional brace (FIG. 7), that essentially comprises a pair of links 41 pivotally connected together at their adjacent ends 42, and at one end being pivotally connected at 47 to a collar 44, that is detachably connected and slidably positioned with respect to the brace 9 of said pushcart or the like, while the opposite and normally lower end of said brace is secured as by a wingnut 45 to a central portion of the rear frame member 18, or to any other suitable part of the device that may be more practical in any given design of vehicle, said brace being adjustable as to length at 46.

Referring to FIGS. 5–9 inclusive, there is here shown a slightly modified form of the device, operatively attached to a pushcart in such manner that the attachment is positioned upon the left rather than the right side of the operator, and being provided with a detachable container for market purchasers and the like, instead of the seat for a second child, as hereinbefore referred to. The same identifying numerals are used upon the pushcart as in FIG. 1, while in FIG. 8 is shown a slightly different pushcart model.

In this form of the vehicle attachment, the same type of clamps 17 are used, but instead of them being secured to the right hand side 4 of the base frame, they are secured to the left side 3 of the same, and the diagonal brace (FIG. 7) is similarly secured to the left side diagonal brace piece 9 rather than to the corresponding brace upon the right side. Otherwise, the resulting assembly is the same, except that the detachable seat 28—33 is omitted, and in its stead is secured a demountable container for packages and the like, such as is shown to the upper right of FIG. 5. This container essentially comprises the inverted U-shaped frame 28—29, but instead of the secondary elements that cooperate to form the seat, in this case there is provided a vertical series of spaced rectangular frame members 50, that are unitarily secured as by welding to the upright corner standards 28, and at regularly spaced intervals are connected together by means of horizontally spaced wires or the like 51, and across the bottom of the enclosed area by spaced horizontal wires or the like 52. The lower ends of the corner standards are then detachably secured normally in the upwardly directed end portions of the inverted U-shaped supporting element 26—27. In this modification of the basic invention, said last-mentioned element is detachably secured to the rear portion 18 of the auxiliary vehicle's base frame by means of a pair of spaced resilient clamps 53 or the like, that normally resiliently encircle said frame portion, and are secured to and depend from the horizontal portion 26 of said supporting element 26—27.

Referring to FIG. 8, the pushcart model here shown is somewhat more simplified than that hereinbefore described, and as illustrated shows attached to it a slightly modified form of the auxiliary device connected upon the right side of the operator, instead of upon the left side as in FIG. 5, and instead of the base frame of said attachment being secured to a horizontal element, such as to one of the sides 3 and 4 of the base frame 1—4, its opposite end portions 54 are arranged diagonally and are detachably secured in the same manner as hereinbefore described to upwardly converging, diagonally extending frame members 55 and 56 of the primary vehicle, while the brace 41 is detachably secured to the upwardly and rearwardly extending portion 8 of the vehicle frame, rather than to the shorter frame element shown in FIGS. 1 and 5.

Having thus described my invention, what I claim and desire to protect by Letters Patent of the United States is:

1. In combination with a propelled wheeled vehicle provided with a base comprised of a framework including, at least, one longitudinally extending tubular member disposed at one side of said vehicle, a generally horizontal weight-supporting platform extending transversely of said vehicle having longitudinally spaced devices mounted thereon detachably embracing said tubular member, said platform adapted for pivotal movement about said tubular member, and a ground-engaging supporting wheel mounted on said platform at a side portion opposite the detachable connection with said vehicle.

2. The structure of claim 1 including a weight-supporting means carried by and foldable with respect to said platform.

3. The structure of claim 1, wherein said platform includes a frame extending transversely of the vehicle and which includes spaced sections having said devices at the ends thereof.

References Cited in the file of this patent

UNITED STATES PATENTS

| | | |
|---|---|---|
| 862,936 | Phillips | Aug. 13, 1907 |
| 958,307 | Plourde | May 17, 1910 |
| 1,077,210 | Alesani | Oct. 28, 1913 |

(Other references on following page)

UNITED STATES PATENTS

| | | |
|---|---|---|
| 1,289,347 | Young | Dec. 31, 1918 |
| 1,520,407 | Dolzer | Dec. 23, 1924 |
| 1,707,186 | Chatfield | Mar. 26, 1929 |
| 2,153,309 | Milz | Apr. 4, 1939 |
| 2,176,326 | Brown | Oct. 17, 1939 |
| 2,574,743 | King | Nov. 13, 1951 |
| 2,716,043 | Baril | Aug. 23, 1955 |
| 2,727,757 | Sawyer | Dec. 20, 1955 |
| 2,865,656 | Musgrave | Dec. 23, 1958 |